US012673674B2

(12) United States Patent
Velten et al.

(10) Patent No.: US 12,673,674 B2
(45) Date of Patent: Jul. 7, 2026

(54) DETERMINING AND OUTPUTTING A SETPOINT ACCELERATION OF A MOTOR VEHICLE FOR AUTOMATICALLY STARTING THE MOTOR VEHICLE BY AN AUTONOMOUS CRUISE CONTROL SYSTEM

(71) Applicant: Bayerische Motoren Werke Aktiengesellschaft, Munich (DE)

(72) Inventors: Thomas Velten, Siegsdorf (DE); Benjamin Reicherzer, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 68 days.

(21) Appl. No.: 18/567,100

(22) PCT Filed: May 2, 2022

(86) PCT No.: PCT/EP2022/061691
§ 371 (c)(1),
(2) Date: Dec. 5, 2023

(87) PCT Pub. No.: WO2022/258260
PCT Pub. Date: Dec. 15, 2022

(65) Prior Publication Data
US 2024/0278778 A1 Aug. 22, 2024

(30) Foreign Application Priority Data
Jun. 7, 2021 (DE) ..................... 10 2021 114 529.5

(51) Int. Cl.
*B60W 30/14* (2006.01)
*B60W 30/17* (2020.01)
*B60W 30/18* (2012.01)

(52) U.S. Cl.
CPC ............ *B60W 30/14* (2013.01); *B60W 30/17* (2013.01); *B60W 30/18027* (2013.01); *B60W 2520/105* (2013.01); *B60W 2720/106* (2013.01)

(58) Field of Classification Search
CPC ........... B60W 30/14; B60W 2520/105; B60W 2720/106; B60W 30/17; B60W 30/18027
See application file for complete search history.

(56) References Cited

U.S. PATENT DOCUMENTS 6,615,127 B2 * 9/2003 Hellmann ............. B60W 30/16
180/170
2002/0143457 A1 * 10/2002 Hellmann ................ B60T 7/22
701/96
(Continued)

FOREIGN PATENT DOCUMENTS

DE       102 41 455 A1       3/2004
DE       103 03 415 A1       8/2004
(Continued)

OTHER PUBLICATIONS

International Search Report (PCT/ISA/210) issued in PCT Application No. PCT/EP2022/061691 dated Aug. 26, 2022 with English translation (4 pages).
(Continued)

*Primary Examiner* — Lindsay M Low
*Assistant Examiner* — Susan E Scharpf
(74) *Attorney, Agent, or Firm* — Crowell & Moring LLP

(57) ABSTRACT
A method for determining a setpoint acceleration of a motor vehicle and for outputting the determined setpoint acceleration for automatically starting the motor vehicle by an autonomous cruise control system is provided. The method has a first step of ramping up a setpoint acceleration from a first value to a second value. The method has a second step of holding the setpoint acceleration at the second value. The
(Continued)

method has a third step of ramping up the setpoint acceleration from the second value to a target acceleration value.

10 Claims, 1 Drawing Sheet

(56)                    References Cited

U.S. PATENT DOCUMENTS

| | | | | |
|---|---|---|---|---|
| 2013/0191003 | A1* | 7/2013 | Hahne | B60W 50/14 |
| | | | | 701/99 |
| 2016/0229409 | A1* | 8/2016 | Pascheka | B60W 30/18154 |
| 2017/0072955 | A1 | 3/2017 | Ediger et al. | |
| 2019/0107069 | A1* | 4/2019 | Zhao | B60W 10/10 |
| 2019/0315355 | A1* | 10/2019 | Tokimasa | B60W 30/14 |
| 2020/0189593 | A1 | 6/2020 | Wishin et al. | |
| 2020/0301444 | A1* | 9/2020 | Sujan | B60W 30/162 |
| 2020/0324765 | A1* | 10/2020 | Lanfranco | B60W 40/06 |
| 2022/0073071 | A1* | 3/2022 | Grelaud | B60W 60/001 |

FOREIGN PATENT DOCUMENTS

| | | |
|---|---|---|
| DE | 10 2009 049 408 A1 | 4/2010 |
| DE | 10 2011 121 442 A1 | 6/2013 |
| DE | 10 2015 202 451 A1 | 8/2016 |
| DE | 10 2018 124 807 A1 | 4/2019 |
| DE | 10 2019 200 209 A1 | 7/2020 |
| DE | 10 2019 214 121 A1 | 3/2021 |
| EP | 2 280 368 A1 | 2/2011 |
| EP | 2 526 003 B1 | 2/2019 |
| JP | 2004-50875 A | 2/2004 |
| JP | 2008-44421 A | 2/2008 |
| WO | WO 2019/146001 A1 | 8/2019 |

OTHER PUBLICATIONS

German-language Written Opinion (PCT/ISA/237) issued in PCT Application No. PCT/EP2022/061691 dated Aug. 26, 2022 with English translation (10 pages).

German Search Report issued in German Application No. 10 2021 114 529.5 dated Jan. 5, 2022 with partial English translation (12 pages).

Korean-language Office Action issued in Korean Application No. 10-2023-7038631 dated Nov. 10, 2025 with English translation (9 pages).

Japanese-language Office Action issued in Japanese Application No. 2023-571353 dated Mar. 4, 2026 with English translation (9 pages).

* cited by examiner

DETERMINING AND OUTPUTTING A SETPOINT ACCELERATION OF A MOTOR VEHICLE FOR AUTOMATICALLY STARTING THE MOTOR VEHICLE BY AN AUTONOMOUS CRUISE CONTROL SYSTEM

BACKGROUND AND SUMMARY

The present invention relates to a method for determining a setpoint acceleration of a motor vehicle and for outputting the determined setpoint acceleration for automatically starting the motor vehicle by an adaptive cruise control system, to a closed-loop controller that is designed to execute the method, and to a motor vehicle having the closed-loop controller.

Various generic devices and methods for automated, in particular autonomous, starting of a motor vehicle are known from the prior art.

For example, DE 10 2011 121 442 A1 describes a method and a device for automatically starting a motor vehicle from standstill, which is detected by a travel sensor. In this case, the road type of the current motor vehicle position is determined from a navigation device or via environment sensors. In the case of particular road types, following prior braking to a standstill, an auto-go mode is automatically activated in which a control unit triggers autonomous starting of the vehicle via a starting unit as soon as starting of another motor vehicle is determined via a start sensing unit.

Also known from the prior art are driving assistance systems of the generic type referred to as adaptive cruise control, in which, in determination of a setpoint acceleration, a speed control system takes into account a distance to a vehicle in front as a feedback and controlled variable, in addition to a speed of the motor vehicle wanted by the driver.

DE 10 2019 214 121 A1, US 2019/315355 A1 and DE 10 2019 200 209 A1 each describe an adaptive cruise control system of the generic type.

DE 10 2019 214 121 A1 describes a method for operating a driver assistance system of an ego vehicle, in particular an ACC system, in which a correcting variable is used for guiding the ego vehicle, the setpoint value of which correcting variable is determined on the basis of relative measurement values of the driving dynamics of the ego vehicle with respect to a vehicle travelling ahead, a time gap closed-loop control being effected between the ego vehicle and a first vehicle travelling ahead, and a time gap closed-loop control being effected between the ego vehicle and a second vehicle travelling ahead, a first correcting variable requirement being derived from the first time gap closed-loop control, and a second correcting variable requirement being derived from the second time gap closed-loop control, and the final correcting variable requirement being derived from an arbitration of the first and second correcting variable requests.

US 2019/315355 A1 describes a cruise control device for a vehicle having a target detection unit and a following control unit. The cruise control device comprises a determination unit designed to determine, during execution of a following control operation, whether or not a small-vehicle switching state, in which a target to be followed is a small vehicle, has occurred; an upper-limit storage unit designed to store as the upper limit value a target acceleration that is set prior to the determination of the small-vehicle switching state by the determination unit under a condition in which the determination unit determines that the small-vehicle switching state has occurred; and a target-acceleration setting unit designed to continue to set the target acceleration to a value equal to or lower than the upper limit value stored in the storage unit until the following control executed for the switched small vehicle as the target to be followed ends.

DE 10 2019 200 209 A1 relates to a method for selecting the target object for automatic proximity control of a single-lane motor vehicle, in which the presence of a second single-lane motor vehicle travelling immediately ahead on the same lane and a third single-lane motor vehicle travelling immediately ahead of the second single-lane motor vehicle is detected by environment sensors, the lateral offset of the second single-lane motor vehicle and of the third single-lane motor vehicle relative to the single-lane motor vehicle being determined and the target object for the method for proximity control being selected in dependence on at least one of the lateral offsets.

In addition, conventional proximity control systems usually have separate interfaces for providing an acceleration specification, or a setpoint acceleration, and for torque distribution in the direction of a drive and a brake of the motor vehicle.

The interface for providing the acceleration specification, in particular the closed-loop controller installed in the interface, and the interface for torque distribution are independent of each other and there is little exchange of information between the interfaces, which in conventional systems can result in jolting when starting from a standstill by the adaptive cruise control system, and thus in uncomfortable starting.

Against the background of this prior art, the object of the present invention is to provide a device and a method that are each suitable for overcoming at least the above-mentioned disadvantages of the prior art.

The object is achieved by the features of the independent claim. The dependent claims relate to preferred developments of the invention.

Accordingly, the object is achieved by a method for determining a setpoint acceleration of a motor vehicle and for outputting the determined setpoint acceleration for automatically starting the motor vehicle by an adaptive cruise control system.

In the method, the setpoint acceleration of the motor vehicle is controlled in a targeted manner in order to ensure comfortable starting. For this purpose, the method comprises at least the three steps described below.

The method comprises a first step of ramping up a setpoint acceleration from a first to a second value.

The method comprises a second step of holding the setpoint acceleration at the second value.

The method comprises a third step of ramping up the setpoint acceleration from the second value to a target acceleration value.

Ramping-up may be understood as increasing, or raising, the setpoint acceleration over time. It is conceivable for the setpoint acceleration to be at least partially or temporarily increased linearly during ramping-up.

The motor vehicle may be stationary during the ramping-up of the setpoint acceleration from the first to the second value and the holding of the setpoint acceleration at the second value.

In the present context, standstill may be understood as an actual speed of the motor vehicle of substantially zero.

It is conceivable for running-up of an internal combustion engine of the motor vehicle to be effected during the holding of the setpoint acceleration at the second value.

However, the method is not limited to use with an internal combustion engine. It is also conceivable for the starting to be effected, additionally or alternatively, by an electric motor.

The motor vehicle may therefore be a motor vehicle that only has an internal combustion engine (so-called pure combustion engine), a motor vehicle that has an electric motor (so-called pure electric vehicle), or a motor vehicle that has both an internal combustion engine and an electric motor (so-called hybrid).

The motor vehicle may start after the holding of the setpoint acceleration at the second value and during the ramping-up of the setpoint acceleration from the second value to the target acceleration value.

In this context, starting may be understood as an actual speed of the motor vehicle that is other than zero. During the starting operation, the actual speed of the motor vehicle may increase.

A slope of the setpoint acceleration during the ramping-up of the setpoint acceleration from the first to the second value may be greater than a slope of the setpoint acceleration during the ramping-up of the setpoint acceleration from the second value to the target acceleration value.

More specifically, a first derivative of a setpoint acceleration slope over time during the ramping-up of the setpoint acceleration from the first to the second value may assume greater values than a first derivative of a setpoint acceleration characteristic over time during ramping-up of the setpoint acceleration from the second value to the target acceleration value.

In other words, a ramp during ramping-up of the setpoint acceleration from the first to the second value may be steeper than a ramp during ramping-up of the setpoint acceleration from the second value to the target acceleration value.

It is conceivable for the slope of the setpoint acceleration to decrease during the ramping-up of the setpoint acceleration from the second value to the target acceleration value in the course of the ramping-up toward the target acceleration value.

More specifically, the first derivative of the setpoint acceleration over time may assume lesser values over time during the ramping-up of the setpoint acceleration from the second value to the target acceleration value.

In other words, the ramp may become flatter as the setpoint acceleration is raised from the second value to the target acceleration value over time, or as the target acceleration value is approached.

The above may be summarized in more concrete terms as described below.

By means of the method described above, the target acceleration can be controlled in a targeted manner to ensure comfortable starting. This control may be based on any preceding closed-loop controller characteristic.

In a first phase of the method, the setpoint acceleration is to be ramped up rapidly from a certain standstill level to positive setpoint acceleration values.

Then, running-up of an internal combustion engine may be enabled as a result of a minimum acceleration requirement being held during a second phase of the method.

After the vehicle has started, a flat ramp toward the target setpoint acceleration level may be run in a third phase of the method. This ramp may become increasingly flatter as the setpoint acceleration approaches the target level. This represents a smooth transition to saturation.

The method can thus ensure a reproducible setpoint acceleration characteristic, such that a comfortable or joltfree automated starting of the motor vehicle can be achieved by an adaptive cruise control system.

Also provided in this case is a closed-loop controller that is designed to at least partially execute the method described above.

The closed-loop controller may be part of a driving assistance system, in particular of an adaptive cruise control system. The closed-loop controller may also be referred to as a control device.

What is described above with reference to the method also applies analogously to the closed-loop controller, and vice versa.

Also provided in this case is a motor vehicle, in particular a car, that comprises the closed-loop controller described above and a torque conversion unit connected to the closed-loop controller. The torque conversion unit is designed to receive the setpoint acceleration output by the closed-loop controller and, based on the received setpoint acceleration, to determine a setpoint driving torque and/or a setpoint braking torque and to output these to the motor vehicle.

What has been described above with reference to the method and the closed-loop controller also applies analogously to the motor vehicle, and vice versa.

In the following, an embodiment is described with reference to FIGS. 1 and 2.

DETAILED DESCRIPTION OF THE DRAWINGS

Figure 1:
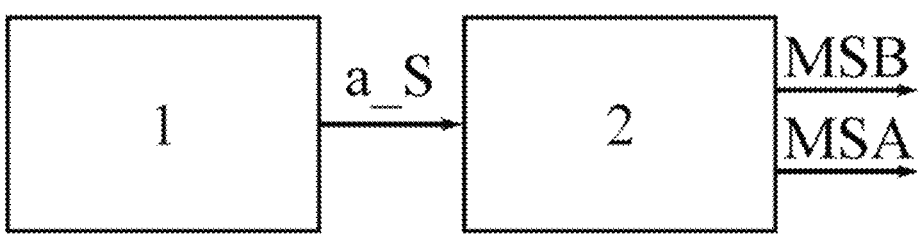
FIG. 1 shows, in schematic form, a motor-vehicle closed-loop controller according to the invention connected to a torque conversion unit.

As can be seen from FIG. 1, the closed-loop controller 1 is connected on the output side to the torque conversion unit 2, which in turn is connected on the output side to the (not represented) motor vehicle.

The closed-loop controller 1 is designed to determine and then output a setpoint acceleration a_S of the motor vehicle. The closed-loop controller 1 in this case is part of an adaptive cruise control system that enables at least partially automated starting of the motor vehicle.

The torque conversion unit 2 is designed to receive the setpoint acceleration a_S output by the closed-loop controller 1 and, based on the received setpoint acceleration a_S, to determine a setpoint driving torque MSA and a setpoint braking torque MSB and to output these to the motor vehicle such that it starts.

The individual phases P1-P4 of the method executed by the closed-loop controller 1 for determining and outputting the setpoint acceleration a_S of the motor vehicle for automatically starting the motor vehicle by the adaptive cruise control system are described in detail in the following with reference to FIG. 2.

In an initial state, the motor vehicle is stationary, i.e., it is not moving and an actual speed of the motor vehicle is zero.

In a first step, or first phase P1, of the method, the setpoint acceleration a_S is ramped up from a first value to a second, greater value.

As soon as this second value is reached, in a second step, or second phase P2, of the method, the setpoint acceleration a_S is held at the second value by the closed-loop controller 1 for a predetermined period of time. During the second phase P2, an internal combustion engine of the motor vehicle is run-up.

The motor vehicle is stationary during the ramping-up of the setpoint acceleration from the first to the second value and the holding of the setpoint acceleration at the second value, i.e., during the first and the second phases P1, P2 of the method.

After the predetermined period of time has elapsed, or after the internal combustion engine has been run-up during the second phase P2 of the method, the closed-loop controller 1 ramps up the setpoint acceleration from the second value to a target acceleration value in a third step, or third phase P3, of the method.

From the beginning of the third phase P3, the motor vehicle starts in the true sense, i.e., the actual speed increases from zero to positive values and the motor vehicle starts to move.

Figure 2:
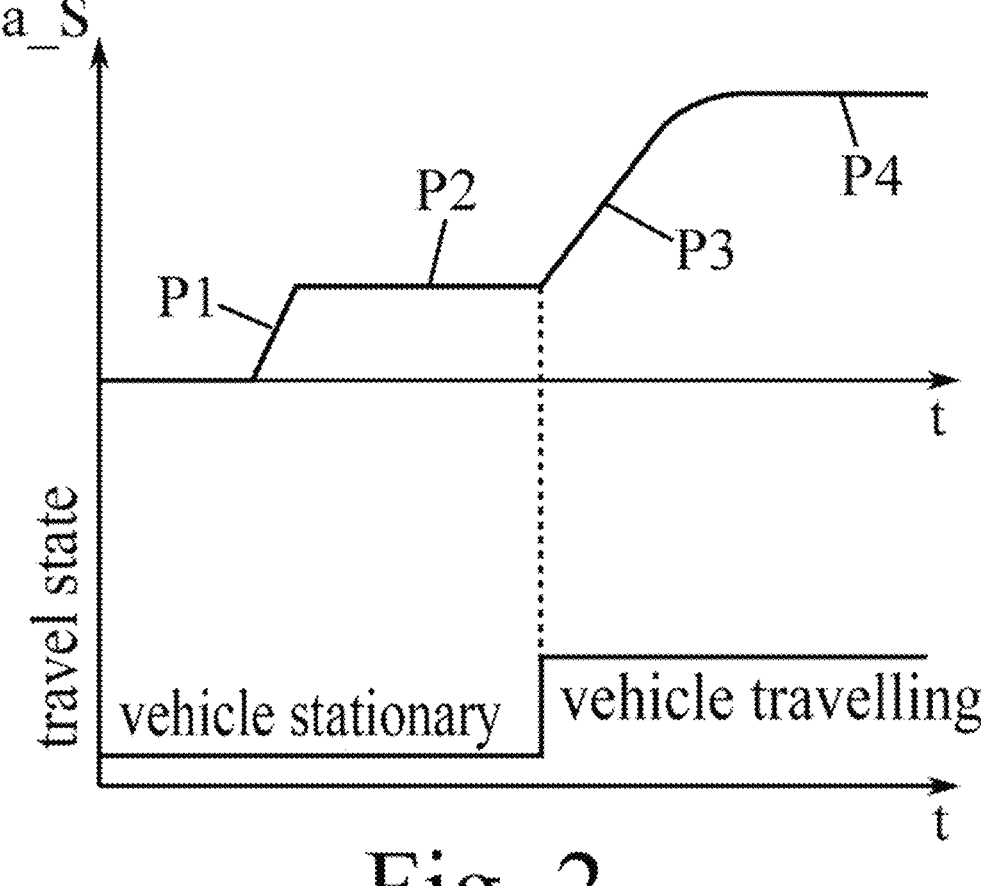
FIG. 2 shows a diagram with a setpoint acceleration characteristic that is determined by the closed-loop controller of FIG. 1 by a method for determining a setpoint acceleration of a motor vehicle and for outputting the determined setpoint acceleration, and that is output to the torque conversion unit.

As can be seen from FIG. 2, a slope of the setpoint acceleration during the ramping-up of the setpoint acceleration from the first value to the second value, i.e., during the first phase P1 of the method, is greater than a slope of the setpoint acceleration during ramping-up of the setpoint acceleration from the second value to the target acceleration value, i.e., during the third phase P3 of the method.

The slope of the setpoint acceleration decreases in the third phase P3, i.e., during the ramping-up of the setpoint acceleration from the second value to the target acceleration value in the course of the ramping-up toward the target acceleration value, in order to achieve a smooth transition toward the target acceleration value.

In a fourth phase P4, or a fourth step, of the method, the target acceleration value may initially be held and then adapted based on target distances to other motor vehicles present in the vicinity of the motor vehicle.

LIST OF REFERENCE DESIGNATIONS 1 closed-loop controller
2 torque conversion unit
a_S setpoint acceleration
MSA setpoint driving torque
MSB setpoint braking torque
P1-P4 phases/steps of the method
t time

What is claimed is:

1. A method for determining a setpoint acceleration of an internal combustion engine of a motor vehicle and for outputting the setpoint acceleration for automatically starting the motor vehicle by an adaptive cruise control system, the method comprising:
ramping up the setpoint acceleration of the internal combustion engine from a first value to a second value;
holding the setpoint acceleration of the internal combustion engine at the second value such that running-up of the internal combustion engine is effected; and
ramping up the setpoint acceleration of the internal combustion engine from the second value to a target acceleration value and controlling movement of the motor vehicle based on the second value of the setpoint acceleration and the target acceleration value.

2. The method according to claim 1, wherein the motor vehicle is stationary during the ramping-up of the setpoint acceleration from the first value to the second value and the holding of the setpoint acceleration at the second value.

3. The method according to claim 1, wherein the motor vehicle starts after the holding of the setpoint acceleration at the second value and during the ramping-up of the setpoint acceleration from the second value to the target acceleration value.

4. The method according to claim 2, wherein the motor vehicle starts after the holding of the setpoint acceleration at the second value and during the ramping-up of the setpoint acceleration from the second value to the target acceleration value.

5. The method according to claim 1, wherein a slope of the setpoint acceleration during the ramping-up of the setpoint acceleration from the first value to the second value is greater than a slope of the setpoint acceleration during the ramping-up of the setpoint acceleration from the second value to the target acceleration value.

6. The method according to claim 2, wherein a slope of the setpoint acceleration during the ramping-up of the setpoint acceleration from the first value to the second value is greater than a slope of the setpoint acceleration during the ramping-up of the setpoint acceleration from the second value to the target acceleration value.

7. The method according to claim 1, wherein a slope of the setpoint acceleration decreases during the ramping-up of the setpoint acceleration from the second value to the target acceleration value in the course of the ramping-up toward the target acceleration value.

8. The method according to claim 2, wherein a slope of the setpoint acceleration decreases during the ramping-up of the setpoint acceleration from the second value to the target acceleration value in the course of the ramping-up toward the target acceleration value.

9. A closed-loop controller designed to execute a method according to claim 1.

10. A motor vehicle comprising a closed-loop controller, configured to determine a setpoint acceleration of an internal combustion engine and output the setpoint acceleration for automatically starting the motor vehicle by an adaptive cruise control system, and a torque conversion unit, connected to the closed-loop controller, that is designed to receive the setpoint acceleration output by the closed-loop controller and, based on the setpoint acceleration, to ramp up the setpoint acceleration of the internal combustion engine from a first value to a second value, hold the setpoint acceleration of the internal combustion engine at the second value such that running-up of the internal combustion engine is effected, and ramp up the setpoint acceleration of the internal combustion engine from the second value to a target acceleration value, determine at least one of a setpoint driving torque and a setpoint braking torque and to output the at least one of the setpoint driving torque and the setpoint braking torque to the motor vehicle.

* * * * *